March 29, 1932.  F. E. McCORD  1,851,927
MECHANISM FOR FEEDING MEASURED QUANTITIES OF LIQUID
Filed July 15, 1929   2 Sheets-Sheet 1
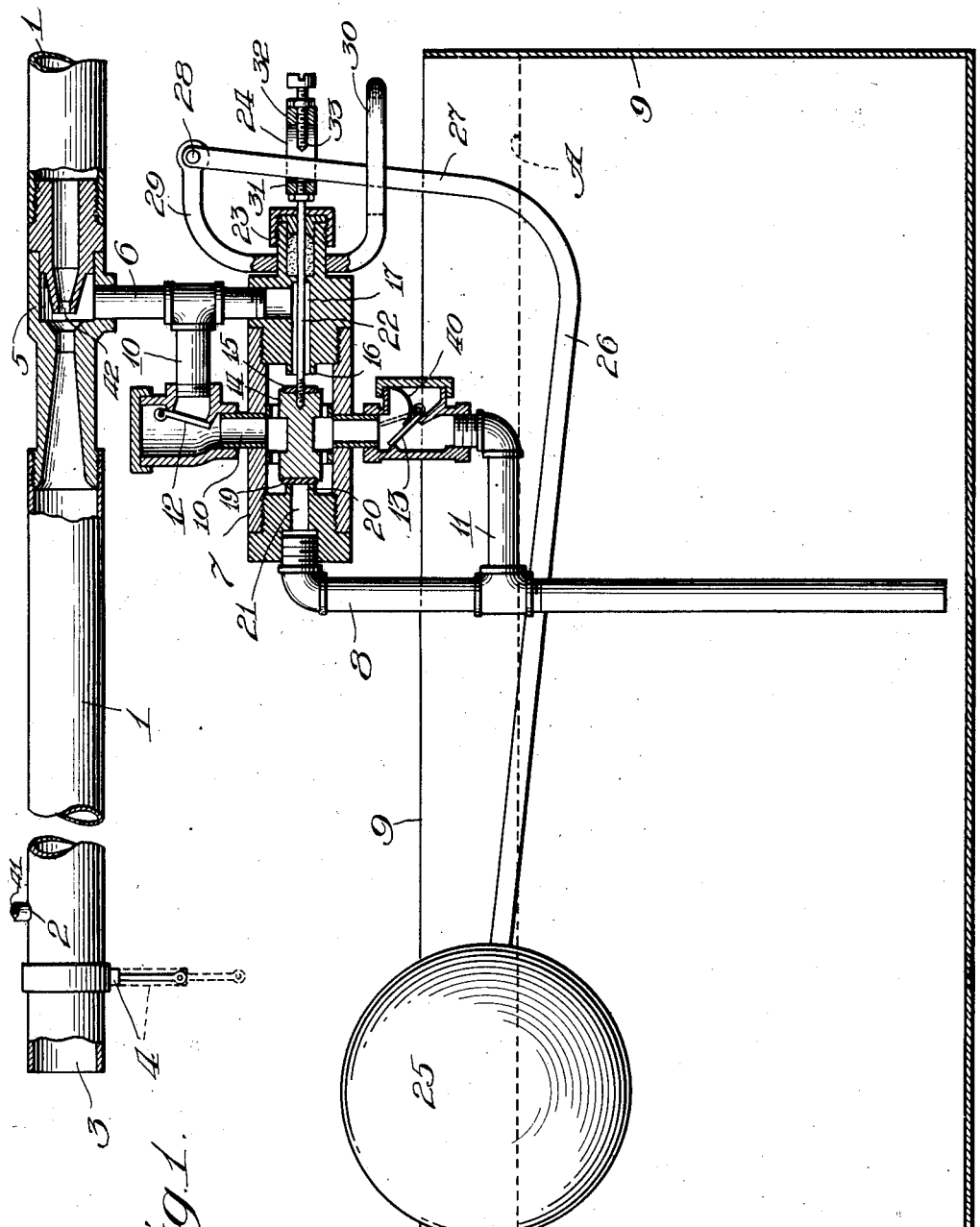

March 29, 1932. F. E. McCORD 1,851,927
MECHANISM FOR FEEDING MEASURED QUANTITIES OF LIQUID
Filed July 15, 1929 2 Sheets-Sheet 2
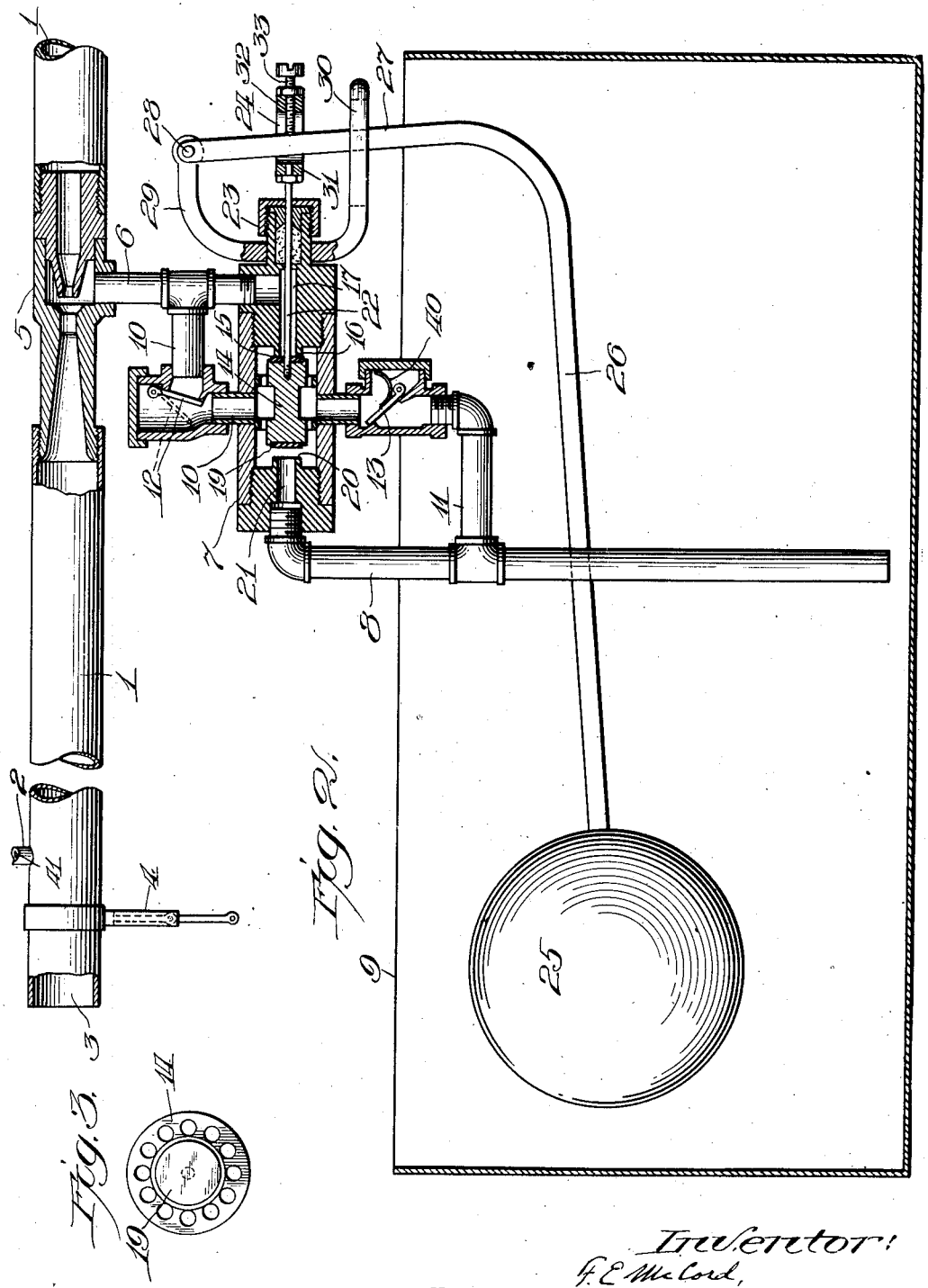

Patented Mar. 29, 1932

1,851,927

UNITED STATES PATENT OFFICE

FREDERICK E. McCORD, OF CHICAGO, ILLINOIS, ASSIGNOR TO WILLIAM J. KENNEY, OF CHICAGO, ILLINOIS

MECHANISM FOR FEEDING MEASURED QUANTITIES OF LIQUID

Application filed July 15, 1929. Serial No. 378,326.

The present invention relates to means for intermittently delivering measured quantities of liquid and automatically replenishing the supply. The object of the present invention is to produce a simple and novel mechanism or apparatus by means of which a measured quantity of liquid will be delivered from a tank and a similar quantity of liquid will be delivered into the tank through variations of the rate of flow of liquid in a conduit.

My invention is particularly applicable to so-called zeolite water softeners, although its application is not limited to that particular field. In a well known type of automatic softener a regenerating condition is brought about by opening a waste or drain pipe that will permit a more rapid flow of the raw or hard water than during service conditions; an ejector being brought into play to suck brine from a brine tank. Viewed in one of its aspects, the present invention may be said to have for its object to produce a simple and novel mechanism or apparatus that is controlled solely by the liquid level in a tank and the pressure in a stationary pipe leading from the tank to cause measured quantities of liquid to be withdrawn from the tank and equal quantities of water or other liquid to be delivered into the tank to replace the liquid that has been withdrawn.

A further object of the present invention is to make it possible easily and accurately to adjust a mechanism of the character referred to, whereby the quantity of liquid that will be fed or delivered during any given cycle may be varied.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figures 1 and 2 are views partly in section and partly in elevation, portions being more or less diagrammatic, illustrating a mechanism or apparatus arranged in accordance with a preferred form of my invention, the parts being shown in different positions in the two views; and Fig. 3 is an end view, on a larger scale, of what may be termed the piston valve.

Referring to the drawings, 1 represents a pipe through which liquid to be consumed is adapted to flow under pressure. The pipe has a service outlet and a waste or drain outlet. In the arrangement shown, the service outlet is a small pipe 2 while the waste outlet is indicated as being merely the open end 3 of the main pipe. Normally the waste outlet is closed or shut off from communication with the main portion of the pipe 1 by means of a valve 4. The elements 2, 3 and 4 have been shown in a diagrammatic way only in order to indicate that water may be discharged from the pipe 1 more rapidly at one time than at another. Inwardly from the outlet 2 and the valve 4 is an ejector device 5 into which leads, at right angles to the pipe 1, a pipe 6 through which liquids may enter or leave the pipe 1.

The pipe 6 is connected to one end of a small casing 7 the chamber in which is preferably cylindrical. A second pipe 8 leads from the opposite end of the casing 7 and extends down into a tank 9, with its open lower end a short distance above the bottom of the tank. A branch 10 from the pipe 6 enters the top of the casing 7 about midway between the ends of the latter. Similarly, a branch pipe 11 extends from the pipe 8 to the bottom of the casing at about the middle of the latter. In the pipe 10 is a valve device having an inwardly seating valve 12. Similarly, in the branch 11 is a valve device having an outwardly seating valve 13. In the casing is a piston device 14 so constructed that fluids may flow past the same from one end of the casing to the other. On one end of the piston device is a suitable packing 15 adapted, in one position of the device, to engage with an annular seat 16 so as to shut off communication between the interior of the casing and a passage 17 that communicates with the pipe 6. A similar packing 19, on the other end of the piston device, is adapted to engage with an annular seat 20, in one position of the device, to shut off communication between the interior of the casing and a port or passage 21 communicating with the pipe 8. To the piston device is fastened a rod 22 that extends through the passage 17 and out through a stuffing box 23 to the exterior of the casing. On the outer end of the rod 22 is a member 24. In the tank is a float 25 carried on a rod having an approximately horizontal portion 26 and an approximately vertical portion 27 that extends up through or past the member 24 and is pivotally connected, as indicated at 28, to a stationary bracket 29. The bracket 29 may be provided with a guide 30 embracing the vertical part of the float stem or rod at a considerable distance below the pivot for the latter. The member 24 has a piece 31 lying inwardly from the member 27 so as to be engaged thereby when the float rises; and it also has a second piece 32 lying outwardly from the member 27 and adapted to be engaged thereby when the float drops. Instead of engaging the piece 32 directly, I prefer that the float stem shall strike a screw 33 or the like passing through the piece 32. The screw may be adjusted in or out, thus making it possible to bring about an engagement between the screw and the float stem when the float has dropped to any desired level. The parts are so proportioned that when the float is up the piston device is pushed toward the left as viewed in Figs. 1 and 2, shutting off communication between the pipe 8 and the interior of the casing; whereas, when the float has dropped, the piston device is drawn over to the right so as to shut off communication between the lower end of the pipe 6 and the interior of the casing.

Normally, assuming the tank to be filled with liquid to the level of the dotted line A in Fig. 1, and the valve 4 to be closed as shown in full lines in Fig. 1, all of the other parts will be in the position shown in full lines in Fig. 1. If no liquid is being withdrawn from the service outlet, there will be no flow through the pipe 1, and there will be no flow into the tank because the static pressure of the liquid in the system will hold the valve 13 closed, whereas direct communication between the interior of the casing and the pipe 8 is shut off by the piston device. In the event that the drain valve or gate 4 is opened, as indicated in dotted lines in Fig. 1, there will be a strong flow of liquid through the pipe 1, creating a suction in the pipe 6 and therefore in the branch pipe 11 above the valve 13. The result is that the valve 13 will be swung up into the position shown in dotted lines, and liquid will be drawn up through the lower end of the pipe 8, through the branch pipe 11, through the interior of the casing, passage 17 and pipe 6 into the ejector device, where the liquid will mingle with that flowing through the ejector device. The liquid level in the tank will gradually lower until the float stem strikes the screw 33, causing the piston device to be moved toward the right. When the liquid level in the tank has dropped to the predetermined low level, the parts will be in the positions shown in full lines in Fig. 2; the piston device closing the passage 17, so that no more liquid can be drawn up through this passage. The suction on the valve 12 holds it closed, and therefore no more liquid will be withdrawn from the tank. This condition remains unchanged as long as the drain valve remains open. When the drain valve is closed, as indicated in dotted lines in Fig. 2, the suction on the pipe 6 ceases and liquid will flow into the same under the pressure in the main conduit, causing the valve 12 to swing open as indicated by the dotted lines in Fig. 2. The result is that liquid will flow from the main pipe 1 through the pipe 6 and branch pipe 10 into the casing and from there through the port 21 and pipe 8 into the tank. The liquid level in the tank gradually rises until, when the predetermined high level indicated in Fig. 1 is reached, the float will have caused the piston device to be forced toward the left, interrupting communication between the interior of the casing and the pipe 8, so that no more liquid will flow from the casing into pipe 8. The liquid can, however, flow down into the branch 11, its pressure holding the valve 13 closed, so that the liquid cannot flow through the branch 11 and into the pipe 8. This condition remains unaltered regardless of liquid flow through the main pipe and out of the service pipe, because the flow will not be rapid enough to lift the valve 13. In other words, no more liquid will enter the tank or be withdrawn therefrom until the drain valve or gate is again opened and start again the cycle of operations just described.

If the tank be the brine tank for a zeolite water softener, it will be seen that a predetermined amount of brine will be automatically withdrawn from the tank whenever the drain is opened; nothing further will occur while the drain thereafter remains open during the washing out of the brine in the softener; and, upon the closing of the drain and the restoration of the softener to its service condition, fresh water will flow into the brine tank so as to fill it again. The amount of brine withdrawn from the tank during each cycle may be nicely regulated by simply adjusting the screw 33.

It will be noted that the pipe 10, the casing and the pipe 8 may be said to constitute one branch between the pipe 6 and the tank, whereas the casing, the pipe 11, and the lower end of the pipe 8 may be said to constitute a second branch leading from the pipe 6 to the tank. It will also be noted that these two branches contain oppositely seated check valves, the valve 12 seating toward the pipe 6 and the valve 13 seating away from that pipe. Furthermore, the piston device with the cooperating annular seats serves as a shut-off valve for each of the two branches. It will be seen that the liquid is withdrawn from the tank or container 9 through one of the branches, whereas the tank or container is refilled through the other branch.

The stopping of the flow of liquid from the tank 9 may be controlled in various ways. For example, the valve 13 may normally be held closed by a spring 40 which is strong enough to prevent the valve from opening while the drain valve 4 is closed, even though liquid is flowing through the pipe 2. Such a spring is shown at 40. On the other hand, if the orifice 41 in pipe 2 is made smaller than the orifice 42 in the nozzle 43 of the ejector device, then liquids cannot escape through the pipe 2 as rapidly as they can be delivered by the ejector device, and back pressure will be set up to hold the valve 13 closed as long as the valve 4 is closed. When the valve 4 is opened, the liquid may flow out of the pipe 1 more rapidly than it can be delivered by the ejector device, and therefore the partial vacuum will be established, tending to lift the valve 13.

While my improved mechanism is particularly useful in systems wherein the rate of flow of liquid under certain conditions will not exceed a predetermined maximum and, at other times will exceed that maximum, it is also useful for supplying measured quantities of liquid under other conditions. For example, if there be only one outlet from the pipe 1, instead of the two outlets 2 and 3 say, the outlet 3, then, upon opening and closing the valve 4, the tank 9 may be refilled and emptied, at will. In other words measured quantities of liquid may be withdrawn from the tank and the supply in the tank be replenished, as often as desired, by the mere act of opening and closing the valve 4.

It is therefore evident that the details of construction may be widely varied and, while I have illustrated and described with particularity only a single preferred form of my invention, I do not desire to be limited to the exact structural details thus illustrated and described; but intend to cover all forms and arrangements which come within the definitions of my invention constituting the appended claims.

I claim:—

1. In combination, a conduit for fluids, a pipe connected to the conduit, means associated with the conduit to create a suction in said pipe when liquid is flowing through the conduit, a liquid container, two branches leading from the pipe into the said container, oppositely seated check valves in said branches, and additional means controlled by the liquid level in said container for alternately closing said branches.

2. In combination, a conduit for fluids, a pipe connected to the conduit, means associated with the conduit to create a suction in said pipe when liquid is flowing through the conduit, a liquid container, two branches leading from said pipe into the container, oppositely seated check valves in said branches, shut-off valves in said branches, and means controlled by the liquid level in said container for alternately opening and closing one of the shut-off valves and simultaneously closing and opening the other shut-off valve.

3. In combination, a conduit for conveying liquids under pressure, a pipe connected to the conduit, means in the conduit to produce a suction in said pipe when liquid is flowing through the conduit, a tank, two branches leading from the said pipe into the tank, oppositely-seated check valves in said branches, a float in the tank, and means controlled by the float for closing one of said branches when the float is up and the other branch when the float is down.

4. In combination, a conduit for conveying liquids under pressure, a pipe connected to the conduit, means in the conduit to produce a suction in said pipe when liquid is flowing through the conduit, a tank, two branches leading from the said pipe into the tank, oppositely-seated check valves in said branches, shut-off valves in said branches, a float in the tank, and means controlled by the float for causing one of the shut-off valves to close and the other to open when the float is up and for causing the first shut-off valve to open and the second to close when the float is down.

5. In combination, a conduit for fluids, a pipe connected to the conduit, a liquid container, a pipe connected to the conduit and provided with two branches leading into the container below the normal liquid level in the latter, oppositely-seated check valves in said branches, the check valve that opens toward the conduit being adapted to open under a predetermined suction, means associated with said conduit for causing a suction in said pipe when a fluid is flowing through the conduit, means for permitting such a flow through the conduit to produce said predetermined suction in the said pipe, and means controlled by the liquid level in said container for closing one of said branches at a predetermined high level and for closing the other branch at a predetermined low level.

6. In combination, a conduit for fluids, a pipe connected to the conduit, means associated with the conduit to create a predetermined suction in the pipe when a fluid is flowing through the conduit at a predetermined rate, means to control the flow through the conduit so that at times fluid flows at said predetermined rate and at other times flows more slowly, a container for liquid, said pipe having two branches opening into the container below the normal liquid level, oppositely seated check valves in said branches, the parts being so proportioned that the check valve that seats away from said conduit will open when subjected to said predetermined suction and will otherwise remain closed, and means controlled by the liquid level in said container for closing the branch containing the last-mentioned check valve at a predetermined low level and for closing the other branch at a predetermined high level.

7. In combination, a conduit for conveying liquids under pressure, a pipe connected to said conduit, means associated with the conduit to produce a suction in said pipe when liquid is flowing through the conduit, a liquid container, two branches leading from said pipe into said container, oppositely seated check valves in said branches, a float in the container, valve devices in said branches, and connections between said float and said valve devices to cause the valve device in that branch containing the check valve that seats away from the conduit to close when the liquid level in the container reaches a predetermined height and to cause the other valve device to close when the liquid level in the container drops to a predetermined level.

8. In combination, a conduit for conveying liquids under pressure, a pipe connected to said conduit, means associated with the conduit to produce a suction in said pipe when liquid is flowing through the conduit, a liquid container, two branches leading from said pipe into said container, oppositely seated check valves in said branches, a float in the container, valve devices in said branches, and connections between said float and said valve devices to cause the valve device in that branch containing the check valve that seats away from the conduit to close when the liquid level in the container reaches a predetermined height and to cause the other valve device to close when the liquid level in the container drops to a predetermined level, and means for adjusting said connections to vary the level at which at least one of said valve devices closes.

9. In combination, a conduit for fluids, a pipe connected to the conduit, means associated with the conduit to create a suction in said pipe when liquid is flowing through the conduit, a liquid container, two branches leading from the pipe into the said container, automatic valves in said branches, one of said valves preventing flow of liquid past the same from the container to said conduit, the other valve preventing liquid flow past the same from the conduit to the container, and means controlled by the liquid level in said container for aternately closing said branches.

10. In combination, a conduit for fluids, a pipe connected to the conduit, means associted with the conduit to create a suction in said pipe when liquid is flowing through the conduit, a liquid container, two branches leading from said pipe into the container, automatic valves in said branches, one of said valves preventing flow of liquid past the same from the container to said conduit, the other check valve preventing liquid flow past the same from the conduit to the container, shut-off valves in said branches, and means controlled by the liquid level in said container for alternately opening and closing one of the shut-off valves and simultaneously closing and opening the other shut-off valve.

11. In combination, a conduit for conveying liquids under pressure, a pipe connected to the conduit, means in the conduit to produce a suction in said pipe when liquid is flowing through the conduit, a tank, two branches leading from the said pipe into the tank, automatic valves in said branches, one of said valves preventing flow of liquid past the same from the container to said conduit, the other valve preventing liquid flow past the same from the conduit to the container, a float in the tank, and means controlled by the float for closing one of said branches when the float is up and the other branch when the float is down.

12. In combination, a conduit for conveying liquids under pressure, a pipe connected to the conduit, means in the conduit to produce a suction in said pipe when liquid is flowing through the conduit, a tank, two branches leading from the said pipe into the tank, automatic valves in said branches, one of said valves preventing flow of liquid past the same from the container to said conduit, the other valve preventing liquid flow past the same from the conduit to the container, shut-off valves in said branches, a float in the tank, and means controlled by the float for causing one of the shut-off valves to close and the other to open when the float is up and for causing the first shut-off valve to open and the second to close when the float is down.

In testimony whereof, I sign this specification.

FREDERICK E. McCORD.